E. JENOI & J. STEVENSON.
RAIL CONTACT FOR VEHICLES.
APPLICATION FILED MAY 15, 1913.
1,106,387.
Patented Aug. 11, 1914.
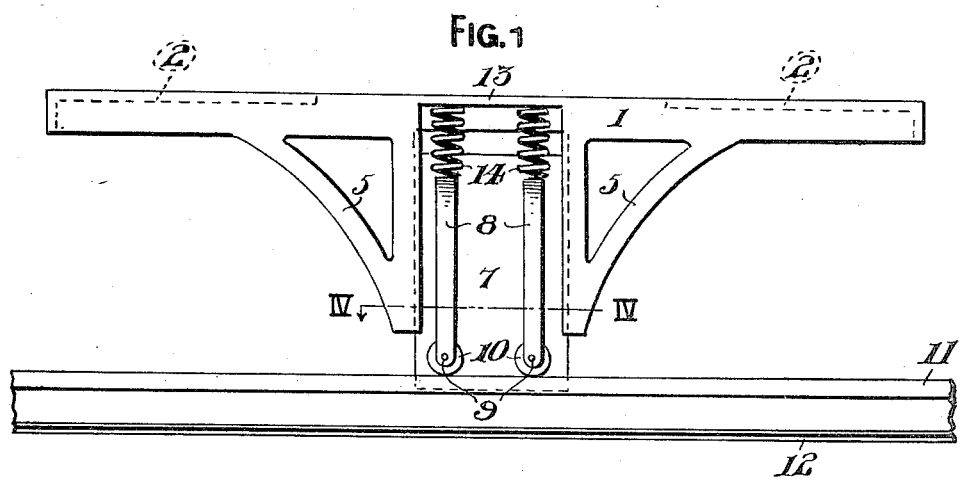
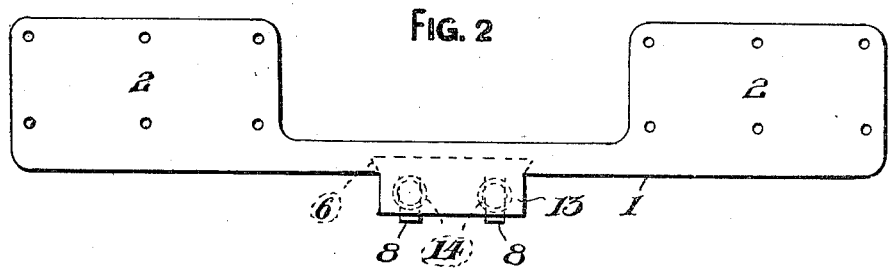
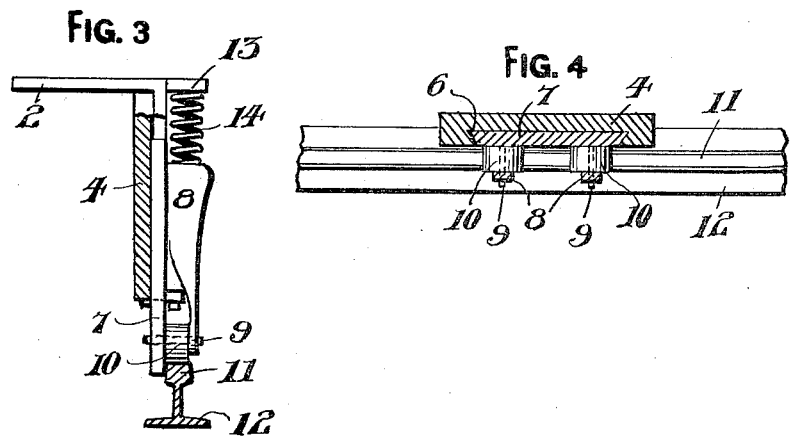
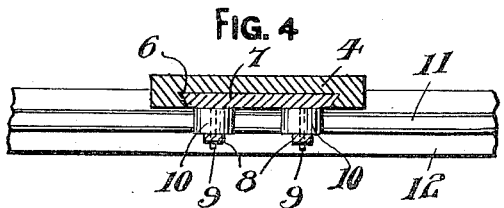
WITNESSES
INVENTORS.
E. Jenoi
J. Stevenson
Henry C. Evert
ATTORNEY
THE NORRIS PETERS CO., PHOTO-LITHO., WASHINGTON, D. C.

UNITED STATES PATENT OFFICE.

EUGENE JENOI AND JOHN STEVENSON, OF JENKINS, KENTUCKY; SAID JENOI ASSIGNOR TO STEVE KRUCHIO, ROZALIA MARY SZABO, AND SARAH KRUCHIO, ALL OF UNIONTOWN, PENNSYLVANIA.

RAIL-CONTACT FOR VEHICLES.

1,106,387.  Specification of Letters Patent.  Patented Aug. 11, 1914.

Application filed May 15, 1913. Serial No. 767,865.

*To all whom it may concern:*

Be it known that we, EUGENE JENOI and JOHN STEVENSON, subjects of the King of Hungary, residing at Jenkins, in the county of Letcher and State of Kentucky, have invented certain new and useful Improvements in Rail-Contacts for Vehicles, of which the following is a specification, reference being had therein to the accompanying drawing.

This invention relates to rail contacts or current collectors especially adapted for electric railways of the third-rail system type, where it is necessary to maintain connection between electrical apparatus on a car, and a third rail.

The primary object of our invention is to provide a truck frame with a yieldable spring pressed contact for a rail that will compensate for any inequalities in the space between the truck frame and the rail, thereby insuring a positive contact and the usefulness of an electric circuit for operating purposes.

A further object of this invention is to provide a yieldable rail contact consisting of comparatively few parts that are simple in construction, durable and applicable to various types of electric vehicles.

With the above and other objects in view the invention resides in the novel construction, combination and arrangement of parts to be hereinafter specifically described and then claimed.

Reference will now be had to the drawing, wherein:—

Figure 1 is a side elevation of a truck frame in accordance with this invention, Fig. 2 is a plan of the same, Fig. 3 is a cross sectional view of the truck frame, Fig. 4 is a longitudinal sectional view taken on the line IV—IV of Fig. 1.

Further describing our invention in detail with reference to the accompanying drawing, wherein like numerals denote corresponding parts throughout: 1 denotes a truck frame having the ends thereof provided with plates 2 that permit of said frame being secured to bolsters or the body of a car (not shown). The frame 1 has a depending guide, comprising a vertical bearing 4 braced by angularly disposed or curved arms 5. The vertical bearing 4 has a longitudinal dovetailed groove 6 and slidably mounted in this groove is a dovetailed bearing plate 7. The outer side of the bearing plate 7 is provided with two parallel hangers 8 and journaled in the lower ends of said hangers and the plate 7 are pins 9 upon which there are mounted contact wheels 10. The contact wheels 10 are adapted to engage a head 11 of a third rail 12 and the contact plate 7 extends downwardly at the inner side of the head 11 and serves somewhat as a guide for preventing the contact wheels from shifting off of the rails.

The bearing plate 4 has the upper end thereof provided with a horizontal extension 13 and interposed between said extension and the upper ends of the hangers 8 are coiled compression springs 14. The tension of these springs is sufficient to hold the bearing plate 7 in a lowered position, whereby the contact wheels 10 will engage the rail, yet permit of the contact wheels yielding when any irregularities are encountered in connection with the rail.

One embodiment of our invention has been illustrated, but it is to be understood that the structural elements are susceptible to such variations and modifications as fall within the scope of the appended claims.

What we claim is:—

1. A contact for rails comprising a truck frame, a depending guide carried thereby, a bearing plate vertically movable in said guide, parallel hangers carried by the outer side of said bearing plate, contact wheels revoluble between said hangers and said bearing plate, and means engaging the upper ends of said hangers for holding said bearing plate and said hangers in a normally lowered position.

2. In a contact for rails, a truck frame, a bearing plate slidably supported by said frame and extending down on the inner side of the rail, hangers carried by the outer side of said bearing plate, contact wheels revolubly mounted between said hangers and said bearing plate, and yielding means engaging the upper ends of said hangers for holding said hangers in a normally lowered position.

3. In a contact for rails, the combination with a truck frame and a rail, of a depending guide carried by said truck frame, a bearing plate movable in said guide and extending downward at the inner side of said rail, parallel hangers carried by the outer side of said plate, revoluble contact wheels between said hangers and said plate, and coiled compression springs engaging the upper ends of said hangers for holding said contact wheels normally in engagement with said rail.

In testimony whereof we affix our signatures in the presence of two witnesses.

EUGENE JENOI.
JOHN STEVENSON.

Witnesses:
 STEVE. BAROCZ,
 GARSTAUG LAMBSTON.